United States Patent [19]

Swearingen

[11] 4,054,175
[45] Oct. 18, 1977

[54] GEOTHERMAL POWER SYSTEM

[76] Inventor: Judson S. Swearingen, 500 Bel-Air Road, Los Angeles, Calif. 96024

[21] Appl. No.: 640,006

[22] Filed: Dec. 12, 1975

Related U.S. Application Data

[60] Division of Ser. No. 513,777, Oct. 10, 1974, Pat. No. 3,951,794, which is a continuation-in-part of Ser. No. 424,470, Dec. 13, 1973, Pat. No. 3,935,102.

[51] Int. Cl.² .......................... F03G 7/02; C02B 5/06
[52] U.S. Cl. ........................................ 165/45; 210/83; 210/58; 165/95; 60/641
[58] Field of Search .................. 210/175; 60/641, 655; 165/195, 119, 4, 45

[56] References Cited

U.S. PATENT DOCUMENTS

| | | | |
|---|---|---|---|
| 2,973,623 | 3/1961 | Nettel | 165/4 |
| 3,125,158 | 3/1964 | Schluderberg | 165/119 |
| 3,627,014 | 12/1971 | Akashi et al. | 165/4 |
| 3,757,516 | 9/1973 | McLabe | 60/655 |
| 3,845,627 | 11/1974 | Hutchinson | 165/45 |

Primary Examiner—Carroll B. Dority, Jr.
Assistant Examiner—Theophil W. Streule, Jr.
Attorney, Agent, or Firm—Browning, Bushman & Zamecki

[57] ABSTRACT

Disclosed are a system for extracting heat from hot unrefined water for the purpose of using this heat to do useful work, and specifically for extracting such heat while minimizing the undesirable effects caused by formation of scale and other solid build-up of scale-forming impurities in the hot unrefined water. Before contact with a heat exchange surface the hot unrefined water has added thereto an agent capable of increasing the formation of non-scale-forming species of said scale-forming impurities. These agents may be added immediately before passing the hot unrefined water through heat exchange equipment and/or directly into a geothermal well.

8 Claims, 3 Drawing Figures

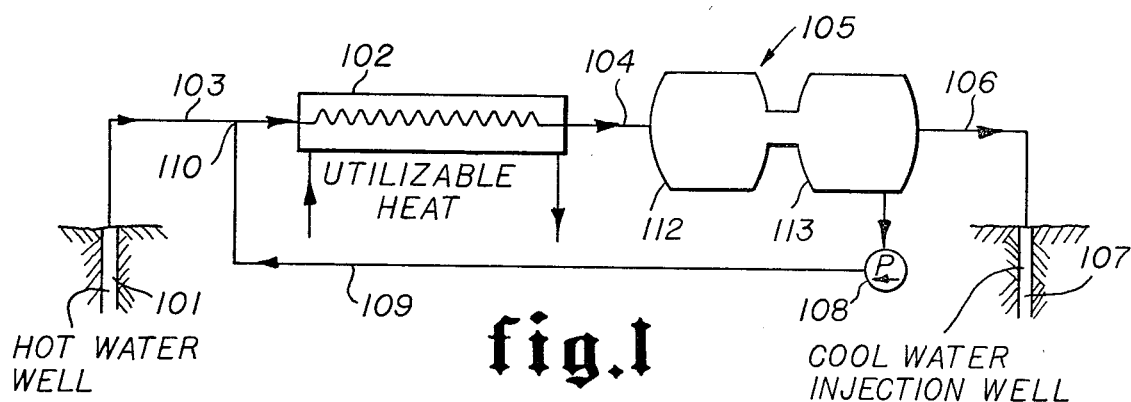
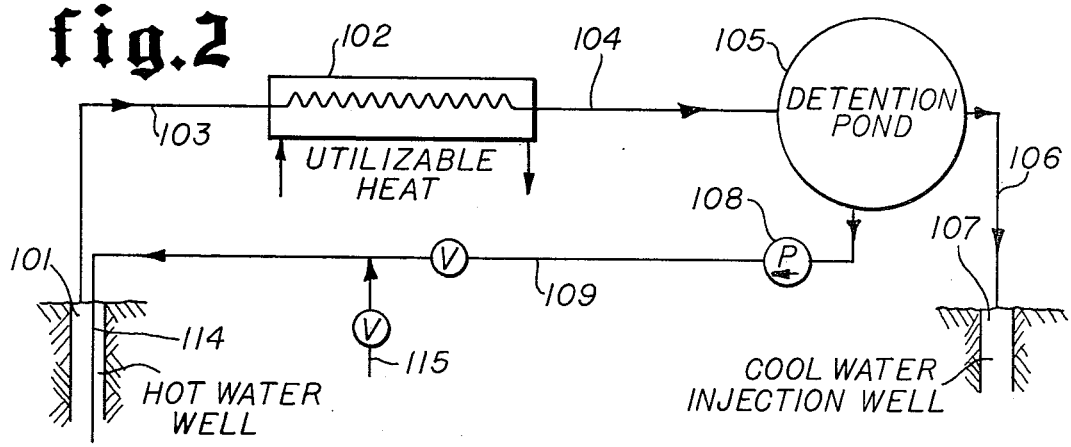
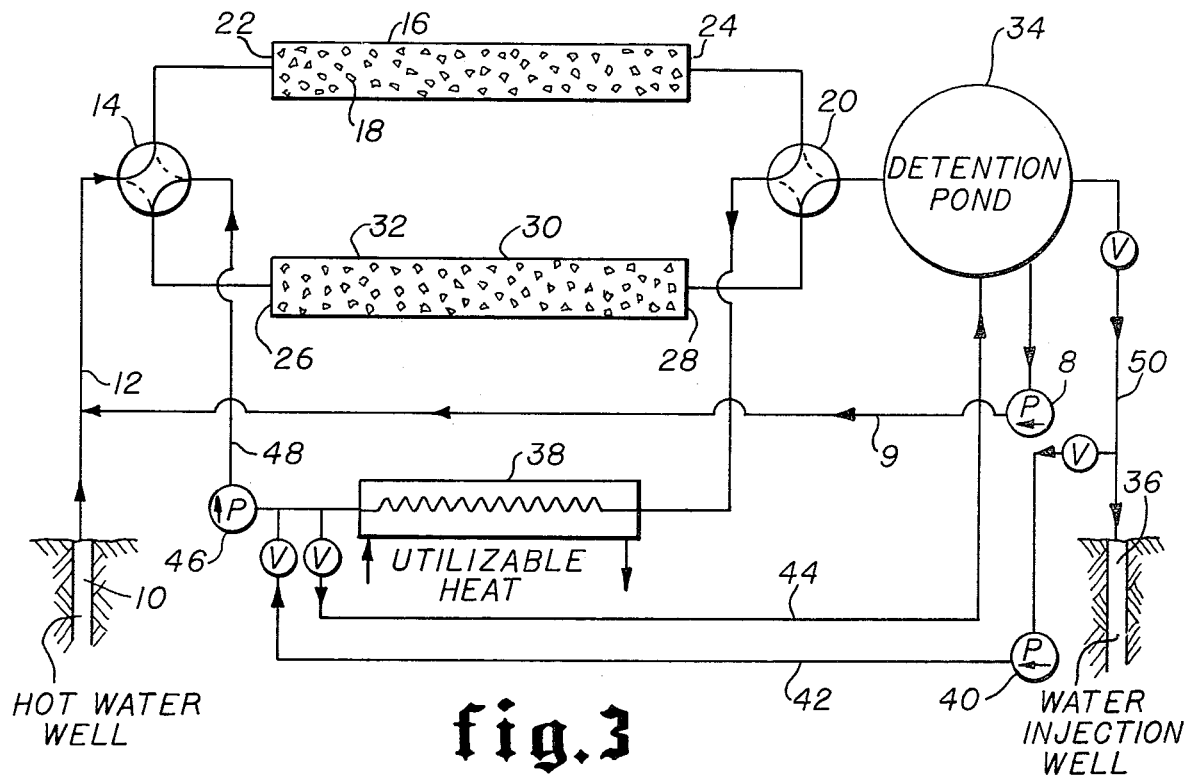

GEOTHERMAL POWER SYSTEM

CROSS-REFERENCE TO RELATED APPLICATION

This is a division, of application Ser. No. 513,777, filed Oct. 10, 1974, now U.S. Pat. No. 3,951,794 granted Apr. 20, 1976, which is a continuation-in-part of U.S. patent application Ser. No. 424,470, filed Dec. 13, 1973, now U.S. Pat. No. 3,935,102 granted June 27, 1976.

BACKGROUND OF THE INVENTION

The present invention relates to a system for extracting heat from hot unrefined water for the purpose of utilizing this heat to do useful work, and more especially, to a system and method for extracting heat from water from a geothermal source wherein the disadvantageous effects upon the heat extraction system as a result of scaling and other solid build-up of impurities contained in the unrefined hot water are substantially avoided.

In the course of the presently ensuing search for additional and improved sources of energy to meet rapidly growing demand, investigators are studying the feasibility of utilizing naturally available energy sources such as, for example, naturally heated water from geothermal sources. This source of energy provides the additional advantage that it is nearly pollution free, since after absorption of its heat, the water can be returned to the ground leaving no polluting by-products.

One of the most significant problems, however, associated with extraction of useful heat from geothermically heated water resides in the fact that the water often contains large amounts of impurities, both in solution and in suspension. This water is referred to herein as unrefined water and is often saturated or supersaturated with impurities such as silica, calcium sulfate, silicates and other compounds. Other impurities such as silica, silicates and iron may be present in the form of collodial dispersions in the water. These impurities give rise to severe problems of scaling, corrosion, etc., on the surfaces of the apparatus utilized to transport the water from the underground source and, even more particularly, the heat exchange apparatus utilized for extracting heat from the water. Purification of the unrefined water prior to extracting its heat is unreasonably expensive and decreases the efficiency of geothermal power sources.

In co-pending U.S. patent application Ser. No. 424,470, of which this application is a continuation-in-part, there is described a novel system and method for extracting heat from hot unrefined water with the avoidance of detrimental effects caused by impurities contained in the water. According to the disclosure of that application, the hot unrefined water is prevented from coming into direct contact with the surfaces of the heat exchanger used to boil a working fluid. Filters and like equipment are not needed. A heat transfer medium in the form of a housing containing porous material such as a bed of gravel or other granular material is used to transfer heat from the unrefined water to clean water which is then passed through the heat exchanger. Such a heat transfer medium will be referred to herein as an accumulator-type heat interchanger. The porous material is inexpensive and expendable and can even be easily cleaned and reused if desired.

In the system a volume of the hot unrefined water is passed through a housing containing porous material which picks up the heat of the water. A volume of clean water is then passed through the housing to pick up the heat from the porous material. The now heated clean water can then be passed through a heat exchanger without significant danger to the surfaces of the exchanger. The clean water can be recycled through the system many times, each time passing through the housing immediately after a volume of the unrefined water.

In another important aspect of the system disclosed in the co-pending application, the source of the clean water may be the unrefined water which has been passed through the porous material. After being removed from the housing, the cooled unrefined water is delivered to a detention receptacle. Here it attains stabilization as many of the impurities settle to the bottom of the receptacle. The liquid which is left on the top of the receptacle is substantially free of impurities to the extent that what impurities are left in the liquid are not sufficient to unduly damage the surfaces of the heat exchanger. It is this substantially impurity-free liquid which is used as the clean water, yet no filtering, etc., is necessary.

A preferred embodiment of the system disclosed in the co-pending application provides for continuous operation of the system by the use of two housing containing porous material. The source of hot unrefined water is connected to the entrance end of one of the housings and hot unrefined water is passed through this housing until the leading edge of this volume of water is at the exit end of the housing. At this time, the source of hot unrefined water is disconnected from the first housing and connected to the entrance end of the second housing; simultaneously the source of cool, clean water is connected to the entrance end of the first housing (having been previously connected to the second). At the same time that the source of clean water is connected to the first housing, i.e. when the leading edge of the preceding volume of unrefined water has reached the exit end of the first housing, the exit end of the first housing is connected to the detention receptacle so that the unrefined water may be deposited therein. Meanwhile, the leading edge of a volume of clean water, which water has been heated, has reached the exit end of the second housing which is then connected to the heat exchanger. Thus, the entrance ends of the housings are alternately connected to the sources of unrefined and clean water and each time the connections at the entrance ends are switched, the connections at the exit ends are also switched to alternately direct unrefined and clean water from the housings to the detention receptacle and the heat exchanger respectively. To allow for proper timing in this simultaneous switching of the connections of the entrance and exit ends of the beds, a temperature front, on one side of which the porous material and water are at their highest temperature and on the other side of which the porous material and water are at their lowest temperature, must move along the porous material with half the velocity of the water volume such that it is at the center of the housing when the leading edge of a volume of water has reached the exit end. One way of achieving this is to choose the porous material such that its heat capacity per unit volume when dry is substantially the same as that of the unrefined water or clean water contained in the voids of a unit volume of the gravel or other porous material.

Further details of the system and method disclosed in the co-pending application will be understood from the disclosure of that application which is hereby specifically incorporated by reference and is relied upon.

It was discovered in accordance with the invention disclosed in the co-pending application that the small concentration of particles remaining in suspension in the substantially impurity-free liquid withdrawn from the detention receptacle as a source of clean water for the heat exchanger gives rise to a beneficial effect, namely, their presence inhibits the formation of scale upon the surfaces of the heat exchange apparatus. This phenomenon is believed to be the result of several interacting factors. The presence of a large number of small suspended or dispersed particles provides a large surface area closely associated with impurities still dissolved in the water, so that upon cooling the water in the heat exchange apparatus impurities tending to precipitate will preferentially precipitate upon the surface area provided by the suspended or dispersed particles as opposed to the surfaces of the heat exchange apparatus. This is especially true where the particles are of the same chemical constituency as the dissolved impurities, due to a seeding effect. Furthermore, where the dispersed particles are of the same constituency as the dissolved impurities tending to precipitate, the particles will also be of the same nature and charge as any material which has deposited in the heat exchange apparatus. Thus, the dispersed particles will show a reduced tendency to associate with deposits in the apparatus.

While the method and apparatus described in the copending application provide a means for extracting heat from hot unrefined water which avoids the significant problem of scaling in the heat exchange apparatus, it is still desirable to improve the efficiency of this method and system, e.g. to decrease the amount of deposits upon the porous material used in this system. Furthermore, it is desirable to seek means for preventing undesirable deposits in the well casing and piping employed for bringing water from an underground source to the heat exchange apparatus. Similarly, it would be desirable to limit the danger of precipitation of impurities from hot unrefined water to the extent that the unrefined water could be passed directly into conventional heat exchange apparatus, without the necessity of subjecting the water to conventional purification techniques which are expensive and inefficient.

SUMMARY OF THE INVENTION

It is, therefore, an object of the present invention to provide a system of extracting heat from hot unrefined water by passing said hot unrefined water directly through conventional heat exchange apparatus.

Another object of the invention is to provide a system which permits the hot unrefined water to be passed directly through heat exchange apparatus without subjecting the water in advance to expensive and inefficient purification techniques.

It is another object of the invention to provide a system for extracting heat from hot unrefined water wherein scaling and other solid build-up of impurities from the water is prevented in the hot water well casing and water transport equipment as well as in the heat exchange equipment.

A further object of the invention resides in the provision of a system for extracting heat from hot unrefined water wherein the agents for beneficially treating said water are derived directly from the source of hot unrefined water.

The invention also has a further object the provision of an improved indirect contact system of extracting heat from unrefined water wherein the cycle life of porous beds of material utilized as preliminary indirect contacting means is substantially lengthened.

Thus, in accomplishing these and other objects, there has been provided in accordance with the present invention an improved method for extracting heat from hot unrefined water containing scale-forming dissolved and dispersed impurities wherein the hot unrefined water is contacted with a heat exchange surface or surfaces. These heat exchange surfaces may be the surfaces of a conventional heat exchanger such as a tube and shell or they may be the surfaces of the porous material in an accumulator-type heat interchanger. The improvement involves adding to the hot unrefined water prior to its contact with the heat exchange surface an agent capable of increasing the formation of non-scale-forming species of said scale-forming impurities whereby scaling and other solid build-up on said heat exchange surface, particularly upon cooling of the water, is minimized. Non-scale-forming species are those which remain in solution or suspension in the unrefined water as it is passed through the heat exchange apparatus without forming scale and/or those which are harmlessly precipitated, e.g. solid non-scale particles which are small enough to remain in suspension in the moving water and be carried out of the heat exchange apparatus thereby.

In one embodiment of the invention, there is added as the aforesaid agent, suspendible particles of finely divided solid material, preferably in the form of a suspension, which may be a slurry or dispersion, and more preferably, particles having the same or similar constituency as at least some of the impurities in the unrefined water. In carrying out this preferred aspect of the invention, the particles are collected from cooled unrefined water subsequent to its contact with the heat exchange surface, and this is achieved preferably by directing the cooled unrefined water into a detention receptacle where it is held until it is stabilized by natural cooling and settling of precipitates and other solids of the impurities originally dissolved and dispersed therein. Some additional generation of non-scale solids, e.g. precipitation of dissolved substances, may occur at this point due to further cooling of the water. At the bottom of the detention receptacle there is formed a portion of the water which is rich in these solid particles of impurities, and it is from this portion of the receptacle that the aqueous suspension of particles is collected and added to the hot unrefined water.)

In another embodiment of the invention, the preliminary accumulator-type heat interchange technique described in the aforementioned co-pending application is employed which comprises passing a volume of hot unrefined water through a housing containing porous material whereby the heat of the unrefined water is given up to the porous material, passing a volume of clean liquid through the housing whereby the heat of the porous material is given up to the clean liquid and thereafter, preferably, passing the heated clean liquid through a heat exchanger whereby the heat of the clean liquid is extracted. In connection with this embodiment, there is used as the clean liquid at least in part water from a substantially impurity-free portion of water which is formed at the surface of the previously defined detention receptacle which receives the unrefined water after it is passed, in this case, through the housing containing porous material.

In yet a further embodiment, there is provided a method wherein the hot unrefined water is derived from an underground geothermal cavity and the addition of finely divided particles to the hot unrefined water is accomplished by adding the particles to the water underground, preferably by injecting a suspension of particles directly into the bore of a geothermal well. Most preferably, the particles are added at a point in the well below a point where the hot unrefined water is becoming supersaturated by being cooled and/or concentrated as, for example, by being partly converted into steam.

In another embodiment there is provided a method wherein the agent added to the hot unrefined water comprises a reagent capable of generating non-scale solids of the impurities in situ. In the case of dissolved impurities this reagent may be capable of causing precipitation of a part of the dissolved impurities, preferably in the form of finely divided particles. In the case of dispersed colloidal impurities, the reagent may be one capable of causing agglomeration of part of these colloidal impurities. In either case this reagent is preferably added directly to the water while it is still underground in a geothermal water well. A similar embodiment comprises adding to the hot unrefined water an agent capable of increasing the solubility of at least some of the dissolved impurities and/or of decreasing the degree of dispersion of some of the colloidal impurities, for example, an agent capable of raising the pH of the water. Again, the addition of such agents may take place directly in the geothermal water well bore. Still another similar embodiment comprises adding a chelating agent to the water.

There is also provided in accordance with the present invention a system for extracting heat from hot unrefined water containing dissolved and dispersed impurities comprising a source of hot unrefined water, a heat exchange means having an entrance end and an exit end, a means for conveying water from the source to the entrance end of a heat exchange means, a detention receptacle for receiving cooled unrefined water from the exit end of the heat exchange means and a means for recycling a suspension, which may be a slurry or dispersion, of solid particles of the impurities from the cooled unrefined water in the detention receptacle for addition to the hot unrefined water at a point prior to its entry into the heat exchanger. The heat exchanger may comprise either a conventional indirect contact heat exchanger, such as a shell and tube counterflow-type exchanger, or an accumulator-type heat interchange system comprising at least one housing containing porous material together with a source of clean liquid, means for selectively connecting the source of unrefined water and the source of clean liquid through the entrance end of the housing, a heat exchanger for extracting heat from the clean liquid and means for selectively alternately connecting the exit end of the housing to the detention receptacle and to the heat exchanger. Preferably, the source of clean liquid is at least partially comprised of the substantially impurity-free water which is produced in the detention receptacle. In the most preferred aspect of this embodiment, there is also provided a second accumulator-type heat interchanger comprising a second housing containing porous material, which housing is of substantially the same size as the first housing and also has an entrance end and an exit end, means for selectively connecting the source of unrefined water and the source of clean water to the entrance end of the second housing, and means for selectively alternately connecting the exit end of the second housing to the detention receptacle and to the heat exchanger. Furthermore, it is advantageous to provide for recycle of the suspension of particles directly into a geothermal well supplying the hot unrefined water.

In another preferred aspect of the system, the detention receptacle comprises at least two separate zones, including a first zone adapted for first receiving the cooled unrefined water and for permitting larger particles of impurities to settle, and interconnected therewith, a second zone adapted for receiving the cooled unrefined water subsequent to the first zone and for permitting finer particles of impurities to settle. The recycle system thus communicates with the second zone of the detention receptacle and withdraws a suspension or slurry comprising the finer particles.

Other objects, features and advantages of the present invention will become apparent from the detailed description which follows, when considered together with the appended drawings.

BRIEF DESCRIPTION OF THE DRAWINGS

FIG. 1 is a schematic flow diagram of the system of the invention, illustrating particularly the concept of a multi-zone detention receptacle.

FIG. 2 is a schematic flow diagram of another embodiment of the system of the invention, illustrating provision for injection directly into a geothermal well.

FIG. 3 is a schematic flow diagram of another embodiment of the invention wherein a preliminary, heat accumulator exchange technique is employed.

DETAILED DESCRIPTION OF THE PREFERRED EMBODIMENTS

Whereas it was discovered in connection with the subject matter disclosed in co-pending application Ser. No. 424,470 discussed hereinabove that the presence of minute suspended solid particles in the clean liquid being circulated to the heat interchanger provides significant advantages, namely, a reduction of scale in the heat exchanger, it has now been discovered in accordance with the present invention that the presence of such solid particles in the unrefined hot water stream likewise gives rise to significant benefits in a system where heat is being extracted from the unrefined hot water, either by conventional heat exchange or heat accumulator interchange techniques. In fact, the presence of these dispersed particles renders it practical to direct the stream of hot unrefined water directly into a heat exchanger without subjecting the water stream to any purification procedures. It has also been discovered in accordance with the invention that certain other agents may be added to the hot unrefined water stream to yield the same effect of reducing the amount of scale formation due to impurities in the water. For example, it has been found that chemical agents may be added to the hot water stream which give rise to the production of non-scale-forming species, often in the form of finely divided particles, in situ. Other chemical agents may be added to the hot water which decrease the degree of saturation of the dissolved impurities or decrease the degree of dispersion of colloidal impurities by other mechanisms. For example, an agent which causes an increase or decrease in the pH of the water may be employed. Chelating agents can also be used. The addition of any of these agents may take place at any point prior to introduction of the unrefined hot water into heat exchange apparatus; however, as shall be discussed hereinbelow, it has been found particularly advantageous to introduce these agents directly downhole into the well bore of a geothermal water well.

As discussed briefly hereinabove, the beneficial effect resulting from the presence of solid particles suspended in the unrefined hot water with regard to the dissolved impurities is believed to be the result of the large amount of intimately located surface area provided by these particles for the reception of the dissolved impurities as they precipitate from the water as a result of changes in temperature and/or their concentration in the water. The suspended solid particles may also collect dissolved impurities by acting as seed crystals, particularly if they are of the same composition as the dissolved impurities or have a similar crystalline structure. The suspended solids are also beneficial with regard to other impurities present in the water, for example, in the form of colloidal dispersions. The suspended solids collide with the dispersed colloidal impurities in the water and collect these impurities on their surfaces thereby reducing the concentration of the colloidal impurities. The suspended solid particles may even actively attract the colloidal impurities, depending on their composition. For example, particles which have a charge opposite that of the colloidal impurities might be chosen.

Thus, the water from geothermal sources is typically saturated and most often becomes supersaturated with dissolved impurities such as silica, calcium sulfate, silicates and other salts as it emerges from the hot water well. The water also typically contains impurities such as silica, silicates, and iron in the form of colloidal dispersions and in concentrations sufficient to cause scaling and solid build-up problems. As the water is cooled down, particularly in the heat exchange apparatus, there is a great tendency for dissolved impurities to precipitate from solution and the dispersed colloidal impurities to drop out, and normally there is encountered an intolerable build-up of deposits upon the heat exchange surfaces.

Furthermore, the hot mineral water from a geothermal well is preferably at a temperature on the order of 400° to 500° F., at which temperature it has a vapor pressure on the order of 200 psi. Deep down in the well bore the hydrostatic pressure is high; however, it is significant to note that as the water emerges from the well and rises near the surface of the ground, the hydrostatic pressure, or the pressure applied by the bottom hole pressure, becomes increasingly lower and the hot mineral water may boil or flash. In some cases it has been attempted to avoid this boiling by pressurizing the water with a pump submerged a few hundred feet into the well, but since a submerged pump is inconvenient and expensive to operate and maintain, the hot mineral water is simply allowed to boil in the well bore near the surface in order to reduce the density of the upper portion of the water column in most methods of producing hot mineral water. The water will then flow with the liberation of steam, which results not only in a cooling of the water supply but also in concentration of the water to the extend of the water removed by formation of steam. Such cooling and concentration contributes to the supersaturation of dissolved impurities in the mineral water and further concentration of the dispersed colloidal impurities, and furthermore, a significant problem arises as a result of the tendency of the impurities to form scale in the upper portion of the well casing as well as within the piping utilized to convey the water from the well to heat exchange equipment. In accordance with one aspect of the present invention, this supersaturation and tendency for scale forming is eliminated or at least significantly reduced by adding one or more of the agents according to the invention to the hot mineral water at a point down in the well which is below a point at which the water is boiling or flashing. The addition may be made simply by introducing the agent down in the well bore by means of a tube extending the required distance down into the well. This treatment can be used alone or to augment similar treatment of the unrefined hot water immediately upstream of the ultimte heat exchange equipment utilized to extract heat therefrom.

It should be noted that in most practical cases at least some scale will result on the surfaces of the heat exchanger and/or the well casing and transport piping. Since in a preferred embodiment of the invention, the particulate material added to the hot water stream is of the same constituency as the scale which has deposited from the stream, i.e. since the particulate material is preferably collected from the mineral water stream after it has been cooled or is formed in situ directly within the hot water stream, the suspended solid particles will have the same electrical charge as the scale, and, therefore, the particles with the impurities they collect on their surfaces will not have a tendency to be attracted to the scale and they thereby resist the formation of further scale. It is to be understood, of course, that any type of particles added to the hot water stream may be caused to have the same charge as the scale which tends to deposit from the stream, for example, by treatment with an appropriate agent. Furthermore, the hot water stream containing solid particles suspended therein tends to act somewhat in an abrasive manner, thereby offering yet another advantageous means for preventing or minimizing the deposition of scale in the apparatus.

As indicated, the preferred method of inroducing finely divided particles into the unrefined hot water streams involves adding a suspension, which may be a slurry or dispersion, of sediment collected from cooled mineral water from the same or a different underground source. Other types of particulate material suitable within the context of the invention include ground or precipitated limestone or clays.

In addition to suspensions of finely divided solid particles, other agents may be added to the hot unrefined water to increase the formation of non-scale-forming species of the scale-forming impurities naturally present in the water. These include reagents capable of generating non-scale solids in situ. Some reagents will cause the precipitation of dissolved impurities by the common ion effect. A reagent is added, one ion of which will combine with one or more of the ions of the dissolved impurity to form a compound which is less soluble than the dissolved impurity. This new compound will then precipitate harmlessly in the form of small solid particles which do not attach to the surfaces of the equipment and which can be carried along by the flowing water, and the degree of saturation or supersaturation of the water will be decreased. For example, the addition of sodium carbonate causes precipitation according to the following equation:

$$CaSO_4 \text{ (dissolved)} + Na_2CO_3 \rightarrow CaCO_3 + Na_2SO_4$$

and the addition of sulfate ion by use of a soluble sulfate compound, e.g., $Na_2SO_4$, produces the following reaction:

$$CaSO_4 \text{ (dissolved)} + SO_4{-} \rightarrow CaSO_4 + SO_4{-}$$

as a result of the effect of the added sulfate ion ($SO_4{-}$). Other reagents giving rise to precipitations of dissolved impurities will be readily apparent to those skilled in the art.

Reagents may also be used to generate non-scale solids of impurities in colloidal dispersion by causing agglomeration of these impurities into non-scale solid particles small enough to be carried by the water but large enough to be readily separated from the water, as by settling in the detention receptacle which receives the unrefined water after it has passed through the heat exchange apparatus.

Scaling problems from dissolved impurities can also be prevented by increasing the solubility of the dissolved solute, thereby also decreasing the degree of saturation with respect to this solute. Similarly, scaling problems of colloidal dispersions can be prevented by decreasing the degree of dispersion of the impurities. For example, the solubility of $SiO_2$ in the hot unrefined water may be increased by the addition of an alkaline compound, for example, caustic, which increases the pH of the solution. The degree of dispersion of a colloidal impurity can also be decreased by the addition of an agent which changes the pH of the unrefined water. Other examples of agents which can be used to alter the pH are NaOH and $Ca(OH)_2$.

Another type of agent which may be used to increase the formation of non-scale-forming species of the impurities, both dissolved and dispersed, is a chelating agent such as one of the chelating agents for iron.

Referring now to FIG. 1, hot underground water is drawn up from a well 101. The hot unrefined water is delivered by a line 103 into the entrance end of a heat exchange apparatus 102, for example, into the tube side of a conventional heat exchanger. After passing through the heat exchanger, the unrefined water, now in a cooled state, is conveyed through line 104 into an aging and settling pond referred to generally with the reference numeral 105. The hot water is cooled in heat exchanger 102 by indirect contact with another fluid on the shell side of the heat exchanger whereby heat utilizable in a conventional heat engine or other power cycle is produced. The hot water, after being cooled in heat exchanger 102 is permitted to cool and stabilize further in settling pond 105, after which it is discharged from the settling pond by line 106 and is returned to the ground into water injection well 107.

The cooled water exiting heat exchanger 102 contains suspended solid particles which, in part, result from precipitation of the dissolved impurities and agglomeration of the dispersed colloidal impuriites in the hot water as a consequence of the temperature change which the water undergoes. The suspended solid particles settle as the water is permitted to remain in the settling pond 105 and the particles accumulate at the bottom of the pond. A slurry of these particles is collected at the bottom of the pond and is pumped by pump 108 positioned in recycle line 109 from the settling pond, and this slurry of finely divided particles is then injected into the hot unrefined water stream at pont 110 which lies upstream of the inlet to the heat exchanger 102. Dispersing of the slurry of particles into the hot water stream provides the suspended particles, the benefits of which have been described hereinabove.

An agent or reagent may be added to the cool unrefined water after it has passed through heat exchanger 102 but prior to the collection of this slurry to increase the generation of the slurry particles, particularly in cases in which the particles already present in the water are insufficient in quantity or otherwise unsuitable for use as an agent to be injected into the hot water in accord with the present invention. Such agents include reagents which will cause the pecipitation of solutes in the water by the common ion effect as described hereinabove. For example, the hot unrefined water may contain solutions which are not sufficiently saturated to present scaling problems as they pass through the heat exchange apparatus. Thus, there would be no need to inject an agent operative upon solutes of these particular dilute solutions into the hot water prior to its entry into the heat exchange apparatus. These solutes may, however, be desirable as components of the slurry particles to be collected from the detention receptacle. Thus, a reagent operative upon the solutes in question might be added to the receptacle prior to the collection of the slurry.

Continuous recycling of these fine particles will inevitably lead to the result that the particles become larger and larger due to the scale-forming material which is deposited thereon during the cooling step. However, as a result of the erosion caused by abrasion between the particles themselves and the apparatus with which they come into contact, and also because of the formation of new precipitation or agglomeration nuclei, a certain amount of sufficiently finely divided particles will always remain in the system. Furthermore, in the detention pond 105 the larger particles tend to settle first, whereas the finer particles require a longer period of time to settle. Thus, by a proper choice of recovery zone within the detention pond, it is possible to selectively recirculate back to the incoming hot water stream only the finer solid particles. In this manner, the process may be operated continuously. The term "finely divided particles" is intended to imply particles of a size which may be suspended in the incoming hot water stream.

Referring also to FIG. 1, the settling or detention pond 105 depicted therein illustrates a further feature of the invention according to which the detention receptacle is provided with two distinct, interconnected zones designated by the reference numerals 112 and 113. The first zone 112 contains the inlet to the detention pond and receives the cooled water from heat exchanger 102 through line 104. This first zone provides a settling area for the larger size particles which have accumulated in the system, in order that these particles may be eliminated from the slurry recirculation system. The water being held in the detention pond then passes from the first zone 112 into the second zone 113, wherein the finer particles begin to settle as the detention time for the water is increased. Slurry pump 108 and recycle loop 109 communicate with the second zone 113 in order that the fine particles collected therein may be recirculated to the incoming hot water stream in line 103.

In FIG. 2 of the drawings, there is illustrated a system embodying the essential elements shown in FIG. 1 and the identical elements have been identified with equivalent reference numerals. In structure and operation the system illustrated in FIG. 2 is identical to that of FIG. 1 except insofar as the recycle arrangement is concerned. In the system of FIG. 2, the slurry of finely divided precipitated particles is removed from the detention pond 105 via line 109 containing a slurry pump 108. But in this instance, line 109 terminates in a length of pipe 114 which extends a substantial distance down into the bore of hot water well 101. In this way, the slurry of fine particles is injected directly into the hot water well. Alternatively, any of the other agents discussed hereinabove which are effective for increasing the formation of non-scale-forming species of the impurities in the hot water may be introduced into the recycle system via line 115, either exclusively or in conjunction with the slurry being provided from detention pond 105.

Referring now to FIG. 3, hot underground water is drawn up from a well 10. The hot unrefined water is delivered via line 12 to a four-way valve 14. When valve 14 is in the position shown in solid lines, the hot water is delivered to the entrance end 22 of a container 16 containing a porous, preferably gravel bed 18. The gravel bed 18 absorbs the heat of the unrefined water as it flows through the housing 16. Meanwhile, a volume of cool clean water or other suitable liquid is pumped from a heat exchanger 38 by pump 46 into the entrance end 26 of a second housing 30 via line 48 and four-way valve 14. The housings 16 and 30 are preferably of the same size and housing 30 contains gravel bed 32. It is to be understood that the gravel 32 in the first half of the housing 30 at the beginning of this step in the cycle is hot, a volume of hot unrefined water having previously been passed therethrough. The second half of the gravel 32 in housing 30 is cool at this point as the unrefined water contained in its voids has given up its heat to the first half of the gravel. Thus, a temperature front is moving through the gravel with half the velocity of the water itself and, at this stage, is located at the middle of the gravel 32. Then, as a volume of clean water begins to flow through the housing 30, it picks up the heat of the first half of the gravel 32 simultaneously driving the hot unrefined water out of the first half of gravel. The latter hot unrefined water now heats the second half of the gravel 32 while itself is cooled.

The volumes of unrefined and clean water are admitted to the respective entrance ends 22 and 26 of the housings 16 and 30 at approximately the same time. These volumes of water have substantially the same flow characteristics so that they flow through their gravel beds at substantially the same speed. Each of these volumes of water may be considered to have a leading edge, i.e. the portion of the volume of water which has passed farthest toward the exit end 24 or 28 of its respective housing. The leading edges of the two volumes reach the exit ends 24 and 28 at approximately the same time, and the portions of the respective volumes of water which are then at the entrance ends 22 and 26 may be considered the trailing edges of their respective volumes of water. The leading edge of the clean water reaches the outlet of the housing 30 at the same time as the above-mentioned high temperature front, and a second low temperature front is now located mid-way through the housing.

At this time valve 14 is switched to the position shown in dotted lines so that a new volume of unrefined water begins to flow into bed 32, the first half of which is now cool, and a new volume of clean water begins to flow into bed 18, the first half of which is now hot. Simultaneously, a second four-way valve 20 connected to the exit ends 24 and 28 of the beds is turned to the position shown in dotted lines so that the cool unrefined water now exiting from housing 16 is delivered to a detention receptacle such as a pond 34 and the clean water which has been heated in bed 32 is delivered to a heat exchanger 38 or to a boiler or the like which may be more or less conventional. Here it gives up the heat absorbed from the unrefined water by means of the gravel bed 32 to a working fluid which ultimately results in the production of useful work.

As described more fully in the co-pending application Ser. No. 424,470, the gravel or other porous material in the housings 16 and 30 is chosen so that the tempeature fronts will move therealong with half the velocity of the flowing water. In particular, the porous material is chosen so that its heat capacity per unit volume when dry is substantially the same as the heat capacity of the unrefined water in the voids of a unit volume of the porous material and also substantially the same as the heat capacity of the clean water in the voids of a unit volume of the porous material.

It will be appreciated that each of the beds 18 and 32 has volumes of unrefined water and clean water alternately passed therethrough in a continuous cycle, the unrefined water giving up heat to the gravel and the gravel giving up het to the clean water. It will also be appreciated that while unrefined water is passing into one bed, clean water is passing into the other so that the total process of heat transfer in exchanger 38 is continuous. By proper switching of valve 20 the unrefined water exiting from one bed is directed into the detention pond 34 while the clean water is entering that bed and clean water exiting from the other bed is directed to the heat exchanger 38 while unrefined water is entering said other bed. The solid line position of valve 20 directs water from housing 16 to the heat exchanger 38 and water from housing 30 to the pond 34; the dotten line position directs water from housing 16 to the pond and water from housing 30 to the heat exchanger.

In the preferred form of the invention, the unrefined water which enters the pond 34 from the housings 16 and 30 has been cooled by giving up its heat to the gravel in the beds. It is then in condition to attain stabilization by further elimination of its supersaturation and settling of the precipitated and agglomerated particles. As it rests in the pond 34, many of the impurities settle to the bottom of the pond leaving on the top of the pond a liquid which is substantially free of impurities. By "substantially free of impurities" is meant that the liquid is sufficiently free of impurities that it can be safely passed through a heat exchanger or other apparatus in direct contact with the surfaces of the apparatus without excessive danger of scaling, corrosion, etc. For example, it should be less than saturated with any dissolved scale-forming impurities so that it will not become supersaturated with same when it is heated in the heat exchange apparatus. If necessary, the water in the detention receptacle may be treated, as with a suitable agent or reagent, to achieve this "substantially impurity free" state. However, the cooling of the water in the detention receptacle, together with whatever agents were added prior to its entry into the heat exchange apparatus, is usually sufficient to accomplish this end. It is part of this substantially impurity-free liquid that is used as at least part of the "clean water" while the remainder of the impurity free liquid may be returned to the ground via line 50 and well 36. It will be understood that part of the clean water may come from another source, however, the substantially impurity-free liquid in the pond may, and preferably does, supply all the clean water.

The fine particles of impurities precipitating to the bottom of the detention pond are removed via line 9 containing therein a slurry pump 8, the particles being removed in the form of a dispersion or slurry thereof in water. This dispersion or slurry is returned via the recycle line 9 to line 12 which transports the hot unrefined water from the hot water well 10 to the porous bed-packed housings 16 and 30. Thus, while it is true that the gravel in beds 18 and 32 is usually inexpensive and expendable, these beds may become fouled with impurities as a result of operation of the system and, therefore, must be periodically replaced or reconditioned for reuse by tumbling and washing or the like. However, as a result of the feature of recycling a slurry or dispersion of finely divided solid particles in the recycle line 9, the frequency with which the gravel in beds 18 and 32 need be replaced or reconditioned is considerably lessened, and in some cases this requirement is completely avoided. It is to be understood in connection with this embodiment of the invention that the slurry or dispersion of particles recycled via line 9 may be also injected directly into the hot water well 10, and furthermore, that other agents defined herein as being suitable for increasing the formation of non-scale-forming species of the impurities dissolved in the hot water may likewise be injected into the hot water supply, either in hot water well 10 or in supply line 12.

It is also to be understood that, since there is some contact between the unrefined water and clean water in the housings and also because some impurities are left in the housings by the unrefined water and picked up by the clean water, the clean water eventually begins to accumulate impurities. As described more fully in the co-pending application, the clean water also contains a small amount of dispersed particles similar to those which are collected from the pond 34 and injected into the unrefined water via line 9. These particles tend to collect on their surfaces many of the impurities which are introduced into the clean water.

Both the dispersed particles from the pond and the impurities which are accumulated in various forms in the clean water are usually present in small amounts and in the form of non-scale-forming species. Thus, their presence in the clean water is essentially harmless. However, as the quantity of these substances increases, it may be desirable to freshen the clean water. The clean water may be freshened by continuously or periodically tapping off quantities of the clean water from communication with the heat exchanger 38 and other parts of the system via line 44 and returning it to the pone 34 for restabilization. These quantities of the clean water are replaced by quantities of substantially impurity-free liquid from the pond 34. These quantities of liquid may be pumped from return line 50 by pump 40 and directed into communication with the heat exchanger and other parts of the system via line 42.

Since it is apparent that many modifications of the system and method of the invention will suggest themselves to those skilled in the art, it is intended that the scope of the invention be defined solely by the claims appended hereto.

I claim:

1. A system for extracting heat from hot unrefined water containing scale-forming impurities comprising:
   a source of said hot unrefined water;
   a heat exchange means having an entrance end and an exit end;
   means for conveying said hot unrefined water from said source to the entrance end of said heat exchange means;
   a detention receptacle for receiving cooled unrefined water from the exit end of said heat exchange means; and means for separating and extracting a dispersion of precipitated particles of said impurities from said cooled unrefined water in said detention receptacle, and recycling said dispersion to said hot unrefined water at a point prior to its entry into said heat exchange means.

2. The system as defined by claim 1 wherein said heat exchange means comprises at least one housing containing porous material, and said system further comprises a source of clean liquid, means for selectively connecting said source of clean liquid, means for selectively connecting said source of unrefined water and said source of clean liquid to the entrance end of said housing to alternately pass a volume of said unrefined water and a volume of said clean liquid therethrough; a heat exchanger for extracting heat from said clean liquid; and means for selectively alternately connecting the exit end of said housing to said detention receptacle and to said heat exchanger to pass unrefined water exiting from said housing into said detention receptacle and to pass clean liquid exiting from said housing through said heat exchanger.

3. The system as defined by claim 2 wherein a portion of the impurities in said unrefined water settles in said detention receptacle leaving a substantially impurity-free liquid at the top of said receptacle and wherein said source of clean liquid is at least partially comprised of said substantially impurity-free liquid, said clean liquid being clean water.

4. The system as defined by claim 2 wherein said clean liquid is clean water and said system further comprises a second housing containing porous material, said second housing being substantially the same size as said first housing and having an entrance end and an exit end; means for selectively connecting said source of unrefined water and said source of clean water to the entrance end of said second housing to alternately pass a volume of said unrefined water and a volume of said clean water through said second housing; and means for selectively alternately connecting the exit end of said second housing to said detention receptacle and to said heat exchanger to pass unrefined water exiting from said second housing into said detention receptacle and to pass clean water exiting from said second housing through said heat exchanger.

5. The system as defined by claim 1 wherein said source of hot unrefined water is an underground geothermal cavity and said recycle means comprises means to inject said dispersion into said water underground.

6. The system as defined by claim 1 wherein said detention receptacle comprises a first zone adapted for first receiving said cooled unrefined water and for permitting larger particles of said impurities to settle, and interconnected therewith, a second zone adapted for receiving said cooled unrefined water subsequent to said first zone and for permitting finer particles of said impurities to settle.

7. The system as defined by claim 6 wherein said means for recycling a dispersion of precipitated particles is in communication with the second zone of said detention receptacle.

8. The system as defined by claim 3 wherein the heat capacity per unit volume of said porous material when dry, the heat capacity of the unrefined water in the voids of a unit volume of said porous material, and the heat capacity of the clean water in the voids of a unit volume of said porous material are substantially equal.

* * * * *

UNITED STATES PATENT AND TRADEMARK OFFICE
CERTIFICATE OF CORRECTION

PATENT NO. : 4,054,175
DATED : October 18, 1977
INVENTOR(S) : Judson S. Swearingen It is certified that error appears in the above-identified patent and that said Letters Patent are hereby corrected as shown below:

In Column 8, line 17, delete "ultimte" and insert therefor --ultimate--.

In Column 9, line 7, delete "-" and insert therefor --=--.

In Column 9, line 9, delete "$SO_4$-" and insert therefor --$SO_4$=--.

In Column 12, line 29, delete "het" and insert therefor --heat--.

In Column 13, line 56, delete "pone" and insert therefor --pond--.

Signed and Sealed this

Thirteenth Day of June 1978

[SEAL]

Attest:

RUTH C. MASON
Attesting Officer

DONALD W. BANNER
Commissioner of Patents and Trademarks